US011838452B2

(12) United States Patent
Kitada et al.

(10) Patent No.: US 11,838,452 B2
(45) Date of Patent: Dec. 5, 2023

(54) CONTROL APPARATUS, CONTROL METHOD AND PROGRAM

(71) Applicant: Nippon Telegraph and Telephone Corporation, Tokyo (JP)

(72) Inventors: Hiroyuki Kitada, Musashino (JP); Takafumi Okuyama, Musashino (JP); Seisho Yasukawa, Musashino (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 0 days.

(21) Appl. No.: 17/636,488

(22) PCT Filed: Aug. 19, 2019

(86) PCT No.: PCT/JP2019/032279
§ 371 (c)(1),
(2) Date: Feb. 18, 2022

(87) PCT Pub. No.: WO2021/033234
PCT Pub. Date: Feb. 25, 2021

(65) Prior Publication Data
US 2022/0279249 A1 Sep. 1, 2022

(51) Int. Cl.
*H04N 21/462* (2011.01)
*H04N 21/2385* (2011.01)
(Continued)

(52) U.S. Cl.
CPC ..... *H04N 21/4621* (2013.01); *H04N 21/2385* (2013.01); *H04N 21/2662* (2013.01); *H04N 21/44* (2013.01); *H04N 21/6332* (2013.01)

(58) Field of Classification Search
CPC .......... H04N 21/4621; H04N 21/2385; H04N 21/2662; H04N 21/44; H04N 21/6332
See application file for complete search history.

(56) References Cited

U.S. PATENT DOCUMENTS 9,049,073 B2* 6/2015 Klappert ............ H04N 21/2385
9,516,085 B2* 12/2016 McCarthy .......... H04N 21/8456
(Continued)

FOREIGN PATENT DOCUMENTS

| JP | 2009246904 | 10/2009 |
| JP | 2014534684 | 12/2014 |
| JP | 2016007015 | 1/2016 |

OTHER PUBLICATIONS

Kitada et al., "A study on bit-rate selection in video streaming with bandwidth reservation," IEICE General Conference, Mar. 19, 2019, 3 pages (with English Translation).

*Primary Examiner* — Mulugeta Mengesha
(74) *Attorney, Agent, or Firm* — Fish & Richardson P.C.

(57) ABSTRACT

A control device that controls a bit rate selectable by a client terminal in a video distribution network in which video data is distributed includes a database configured to store distribution information, band allocation information, and distribution system information, the distribution information containing information on video data in a distribution system, the band allocation information containing an allocated band of each session in which the distribution system performs video distribution, and the distribution system information containing a channel band of the distribution system, and a control unit configured to receive a viewing request from the client terminal, calculate an available band in the distribution system with reference to the database, and determine a maximum bit rate selectable by the client terminal based on the available band and one or more bit rates of video data corresponding to the viewing request.

15 Claims, 15 Drawing Sheets

(51) Int. Cl.
   *H04N 21/2662*   (2011.01)
   *H04N 21/44*   (2011.01)
   *H04N 21/6332*   (2011.01)

(56) References Cited

U.S. PATENT DOCUMENTS

| | | | |
|---|---|---|---|
| 2006/0215760 A1* | 9/2006 | Monaco | H04N 21/8456 |
| | | | 375/E7.157 |
| 2009/0245126 A1* | 10/2009 | Kitani | H04L 47/12 |
| | | | 370/252 |
| 2013/0091297 A1* | 4/2013 | Minder | H04L 65/80 |
| | | | 709/231 |
| 2013/0282876 A1 | 10/2013 | Watanabe | |
| 2017/0055007 A1* | 2/2017 | Phillips | H04N 21/8456 |

\* cited by examiner

Fig. 4

DISTRIBUTION INFORMATION

| CONTENT ID | CHUNK SIZE [msec] | CONTENT LENGTH | LIST OF RESOLUTION: BIT RATE [Mbps] |
|---|---|---|---|
| 1 | 2000 | 00:02:00 | 3840x2160:10, 1920x1080:5, 1280x720:3, 640x360:0.5 |
| 2 | 3000 | 00:15:30 | 1920x1080:5, 1280x720:3, 640x360:0.5 |
| 3 | 5000 | 00:01:30 | 3840x2160:10, 1920x1080:5, |
| ... | ... | ... | ... |

BAND ALLOCATION INFORMATION

| SESSION ID | CONTENT ID | DISTRIBUTION SYSTEM ID | ALLOCATED BAND [Mbps] | DISTRIBUTION START TIME |
|---|---|---|---|---|
| 1 | 1 | SV-1 | 60 | yyyy/mm/dd 20:22:30 |
| 2 | 41 | SV-1 | 10 | yyyy/mm/dd 20:20:13 |
| 3 | 20 | SV-2 | 6 | yyyy/mm/dd 20:18:20 |
| ... | ... | ... | | ... |

DISTRIBUTION SYSTEM INFORMATION

| DISTRIBUTION SYSTEM ID | CHANNEL BAND [Gbps] |
|---|---|
| SV-1 | 10 |
| SV-2 | 20 |
| SV-3 | 5 |
| ... | ... |

Fig. 7

| CONTENT ID | CHUNK SIZE [msec] | CONTENT LENGTH | LIST OF RESOLUTION: BIT RATE [Mbps] |
|---|---|---|---|
| 1 | 2000 | 00:02:00 | 3840x2160:10, 1920x1080:5, 1280x720:3, 640x360:0.5 |

Fig. 8

NOTIFICATION INFORMATION

| SESSION ID | LIST OF RESOLUTION: BIT RATE [Mbps], OF WHICH NOTIFICATION IS ISSUED |
|---|---|
| 1 | 1920x1080:5,<br>1280x720:3,<br>640x360:0.5 |

Fig. 9

NOTIFICATION INFORMATION

| SESSION ID | LIST OF RESOLUTION: BIT RATE [Mbps], OF WHICH NOTIFICATION IS ISSUED |
|---|---|
| 1 | 3840x2160:10,<br>1920x1080:5,<br>1280x720:3,<br>640x360:0.5 |

CONTROL APPARATUS, CONTROL METHOD AND PROGRAM

CROSS-REFERENCE TO RELATED APPLICATIONS

This application is a National Stage application under 35 U.S.C. § 371 of International Application No. PCT/JP2019/032279, having an International Filing Date of Aug. 19, 2019. The disclosure of the prior application is considered part of the disclosure of this application, and is incorporated in its entirety into this application.

TECHNICAL FIELD

The present invention relates to a control of a bit rate of video data in a video distribution service.

BACKGROUND ART

In video distribution services, an adaptive bit rate (ABR) method in which a client terminal can dynamically select a bit rate of required video data in accordance with a viewing environment (such as a channel speed of a device or a network) is widely used.

In the future, it is expected that network distribution of high definition video such as 4K/8K will increase. HTTP Streaming in which a video is distributed over HTTP is widely used in recent years, as a protocol used in video distribution via the Internet. MPEG-DASH and HLS are typical protocols to achieve HTTP Streaming.

In such protocols, the function of the ABR is implemented, and a client terminal performs a control for stably playing a video with the quality as high as possible, in accordance with a viewing environment. Specifically, an operation of dynamically selecting the appropriate bit rate from a plurality of resolutions (bit rates) is performed.

CITATION LIST

Non Patent Literature

NPL 1: KITADA Hiroyuki, OKUYAMA Takafumi, YASUKAWA Seisho "A study on bit rate selection when securing bandwidth in video distribution", 2019 IEICE Conference, B-6-75, March 2019

SUMMARY OF THE INVENTION

Technical Problem

In order for a distribution operator to perform video distribution with high quality, it is necessary to control the distribution in consideration of the high load state of a distribution system and the congestion in a network, but, in the video distribution based on the ABR, the bit rate of the distributed data is dynamically changed by an autonomous operation of the client terminal. Thus, the bit rate may not be stable depending on the environment.

In particular, when the network is close to a congested state, there is a concern that the bit rate of video data acquired by the client terminal is frequently changed, and the viewing quality is lowered (NPL 1).

The present invention has been made in view of the above circumstances, and an object of the present invention is to provide a technique capable of appropriately controlling a bit rate of video data, which is selectable by a client terminal, in a video distribution service in which the bit rate of the video data can be dynamically selected.

Means for Solving the Problem

According to a technique of the disclosure, there is provided a control device for controlling a bit rate selectable by a client terminal in a video distribution network in which video data is distributed. The control device includes a database configured to store distribution information, band allocation information, and distribution system information, the distribution information containing information on video data in a distribution system, the band allocation information containing an allocated band of each session in which the distribution system performs video distribution, and the distribution system information containing a channel band of the distribution system, and a control unit configured to receive a viewing request from the client terminal, calculate an available band in the distribution system with reference to the database, and determine a maximum bit rate selectable by the client terminal based on the available band and one or more bit rates of video data corresponding to the viewing request.

Effects of the Invention

According to the technique of the disclosure, there is provided a technique capable of appropriately controlling a bit rate of video data, which is selectable by a client terminal, in a video distribution service in which the bit rate of the video data can be dynamically selected.

BRIEF DESCRIPTION OF DRAWINGS

FIG. 4 is a diagram illustrating an example of distribution information in the DB in the control device.

FIG. 5 is a diagram illustrating an example of band allocation information in the DB in the control device.

FIG. 6 is a diagram illustrating an example of distribution system information in the DB in the control device.

FIG. 7 is a diagram illustrating an example of contents in a content request.

FIG. 8 is a diagram illustrating an example of information of which a client terminal is notified from a control unit.

FIG. 9 is a diagram illustrating another example of the information of which the client terminal is notified from the control unit.

DESCRIPTION OF EMBODIMENTS

Hereinafter, an embodiment of the present invention (the embodiment) will be described with reference to the drawings. The embodiments to be described below are merely exemplary and embodiments to which the present invention is applied are not limited to the following embodiments.

System Configuration

Figure 1:
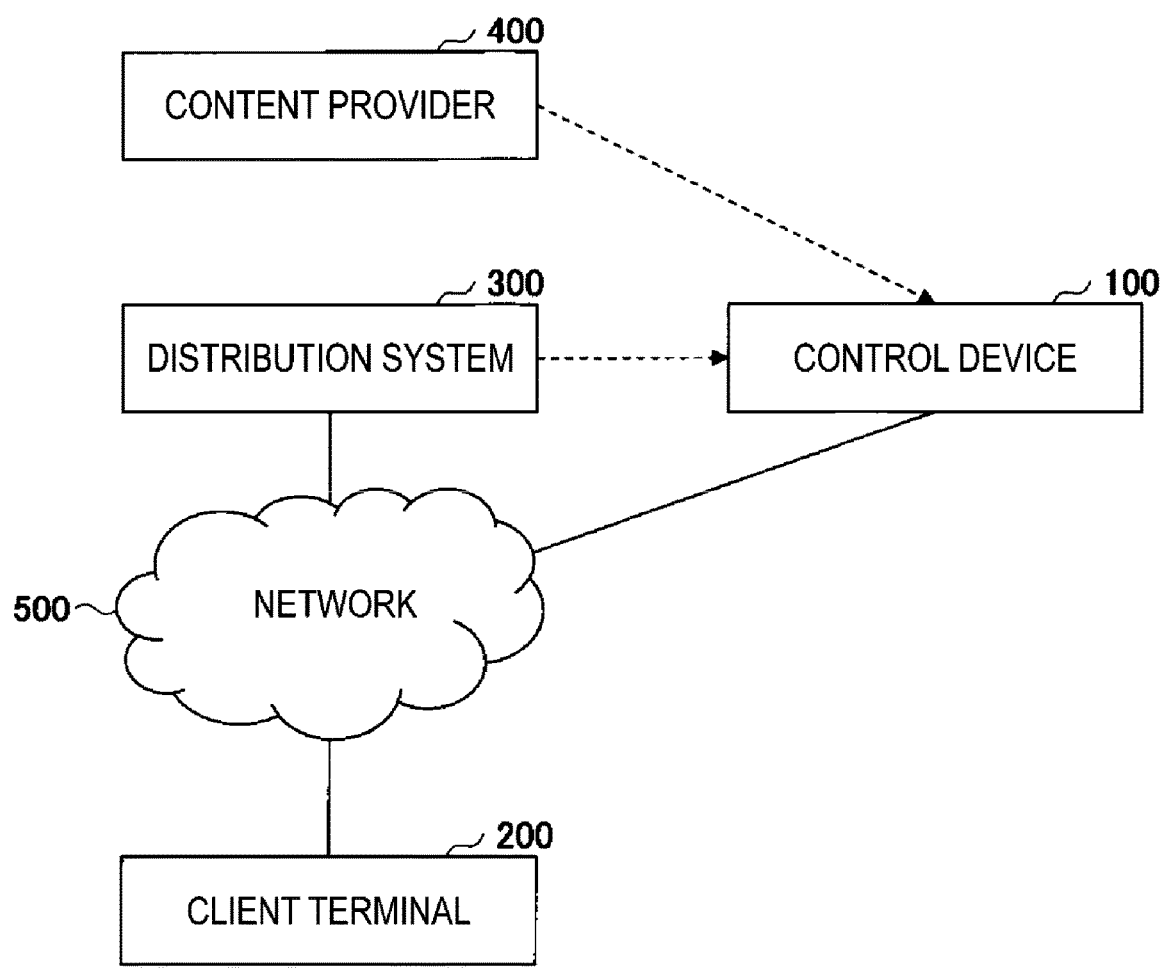
FIG. 1 is a diagram illustrating an overall configuration of a system according to an embodiment of the present invention.

FIG. 1 illustrates an overall configuration of a system according to an embodiment of the present invention. The system may be referred to as a video distribution network. As illustrated in FIG. 1, a control device 100, a client terminal 200, and a distribution system 300 are provided in the system and are connected to a network 500. FIG. 1 also illustrates a content provider 400 that provides video contents (video data) to the distribution system 300 and the like.

As described later, distribution information is registered in the control device 100 from the distribution system 300 or the content provider 400, and thus the flow of the information is indicated by a dotted line in FIG. 1.

The client terminal 200 illustrated in FIG. 1 is a terminal that includes an ABR function and plays a video. The distribution system 300 is a system having a video data distribution function. The distribution system 300 may be referred to as a distribution server 300. The network 500 is, for example, the Internet, but may be a network other than the Internet.

The control device 100 has functions of performing a rate control algorithm (may be referred to as a rate control program) based on distribution information of which a notification is received from the distribution system 300 or the like, and a viewing request of contents of which a notification is received from the client terminal 200, and thus calculating the maximum bit rate selectable for video data corresponding to the viewing request and transmitting notification information to the client terminal 200 or the like based on the calculated result.

Figure 2:
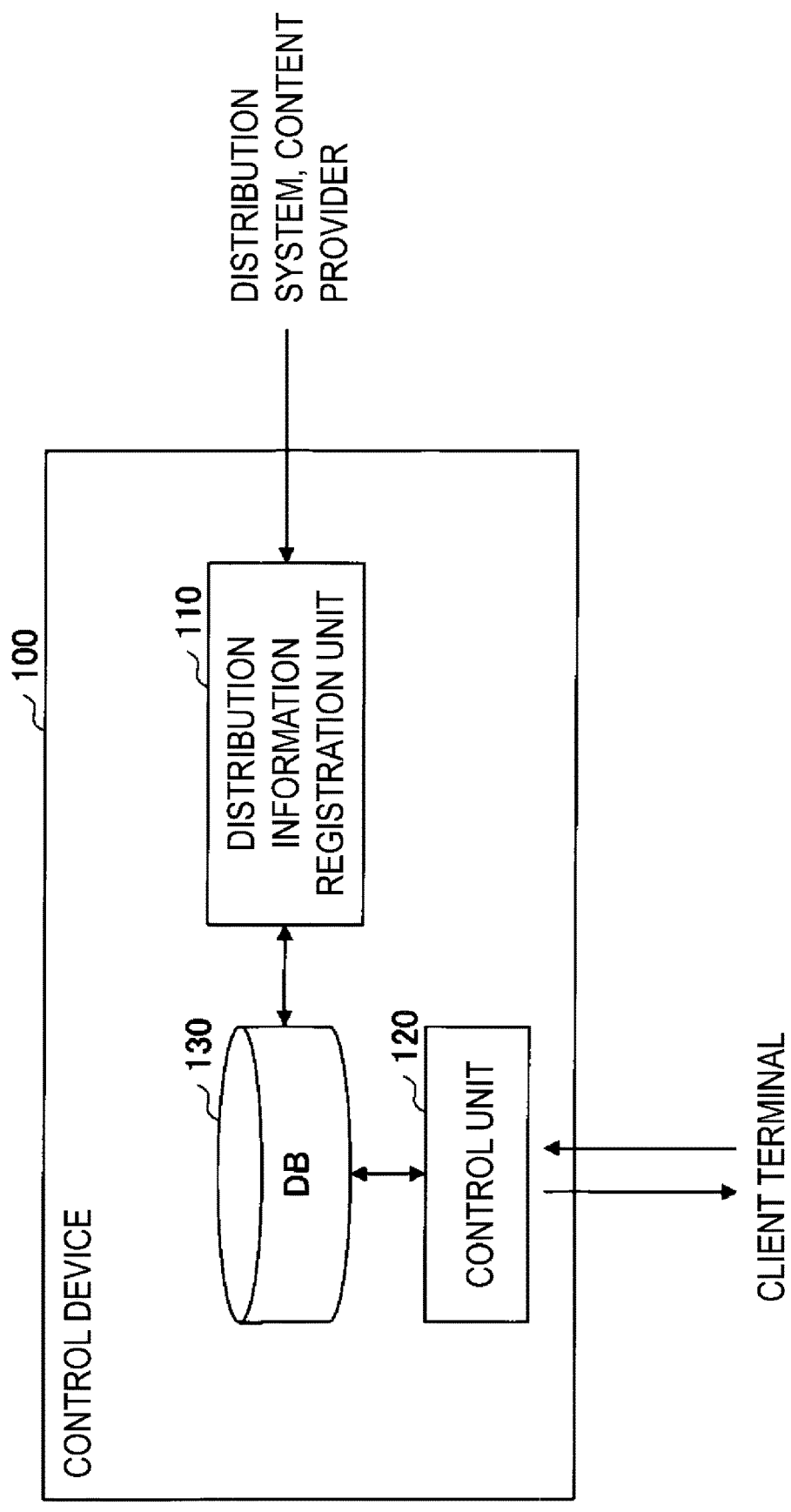
FIG. 2 is a diagram illustrating a functional configuration of a control device.

FIG. 2 illustrates a functional configuration of the control device 100. As illustrated in FIG. 2, the control device 100 includes a distribution information registration unit 110, a control unit 120, and a DB (database) 130. The functional units and the DB described above may be physically disposed in one device or may be provided in physically separated devices connected to each other via a network. In all cases, the configuration having the distribution information registration unit 110, the control unit 120, and the DB (database) 130 may be referred to as the control device 100. The control device 100 may be referred to as a control system 100. When one device including the control unit 120 is connected to one or more devices including the distribution information registration unit 110 and the DB (database) 130 via a network, the device including the control unit 120 may be referred to as the control device.

The distribution information registration unit 110 receives distribution information (information regarding video data distributed by the distribution system 300) containing information such as a content ID and a content length, from the distribution system 300, the content provider 400, and the like, and registers the received distribution information in the DB 130.

The control unit 120 receives a viewing request (which may be referred to as a content request) transmitted from the client terminal 200, and extracts information associated with the corresponding content ID from the DB 130 based on the received viewing request. Then, the control unit 120 calculates the maximum bit rate that can be selected, based on the rate control algorithm, and notifies the client terminal 200. The control unit 120 regularly updates the information in the DB 130.

Examples of the information stored in the DB 130 and notification information for the client terminal 200 will be described below, and details of such pieces of information and the detailed operation of the control device 100, which is related to such pieces of information will be described in examples described below.

Figure 3:
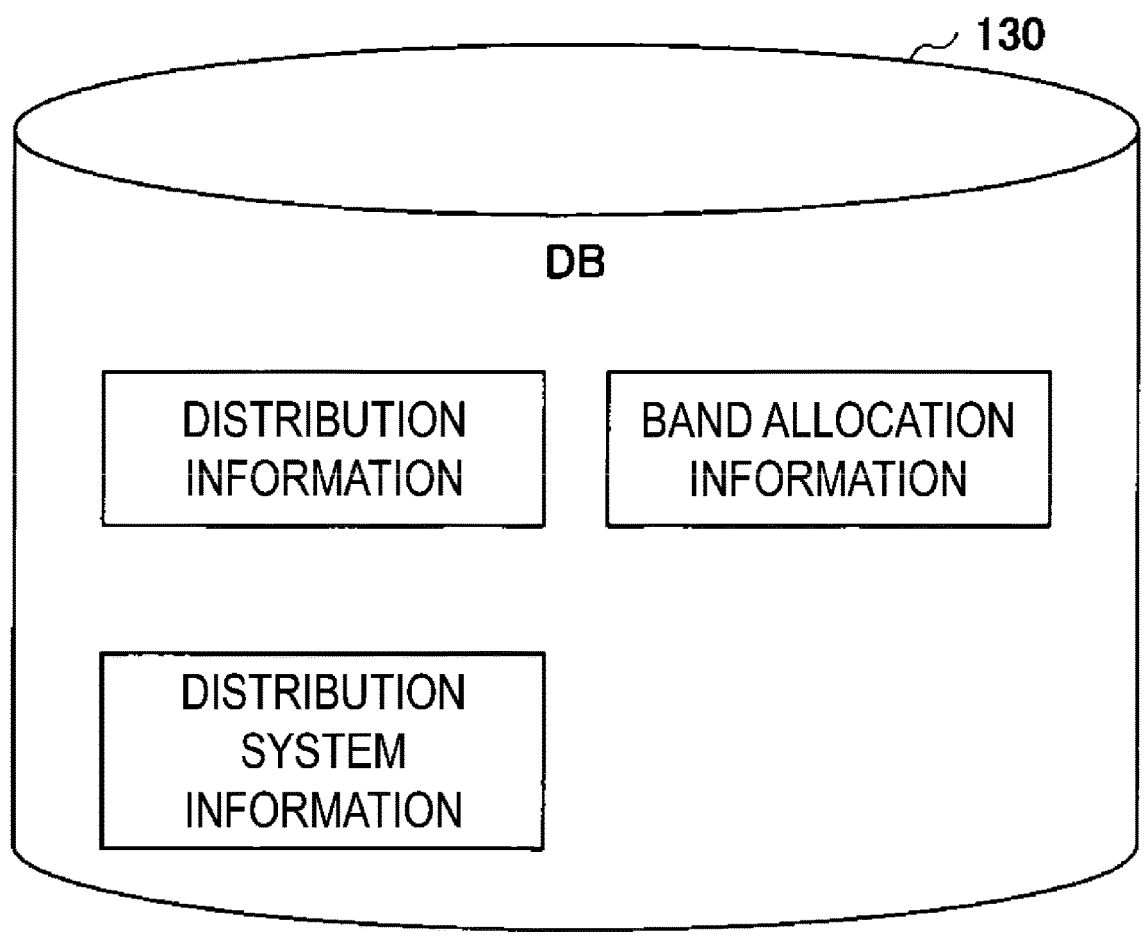
FIG. 3 is a diagram illustrating a configuration of a DB in the control device.

FIG. 3 illustrates the information stored in the DB 130. As illustrated in FIG. 3, the DB 130 stores distribution information, band allocation information, and distribution system information. FIGS. 4 to 6 illustrate an example of the distribution information, an example of the band allocation information, and an example of the distribution system information, respectively.

FIG. 7 illustrates an example of the distribution information when a viewing request transmitted from the client terminal 200 indicates a request for a content having a content ID of 1.

FIG. 8 illustrates an example of notification information transmitted to the client terminal 200 when a rate limit is performed on the distribution information related to the viewing request illustrated in FIG. 7. FIG. 9 illustrates an example of the notification information transmitted to the client terminal 200 when the rate limit is not performed on the distribution information related to the viewing request illustrated in FIG. 7.

Example of Hardware Configuration

The control device 100 can be implemented by causing a computer to execute a program describing details of processing as described in the embodiment, for example. The control device 100 may also be implemented in a manner that each of the distribution information registration unit 110 and the control unit 120 in the control device 100 causes the computer to execute a program describing details of processing as described in the embodiment.

That is, the control device 100 can be implemented by executing a program corresponding to processing performed by the control device 100 using hardware resources such as a CPU and a memory mounted in a computer. The program can be recorded on a computer-readable recording medium (a portable memory or the like) to be stored or distributed. The program can also be provided via a network such as the Internet or an electronic mail.

Figure 10:
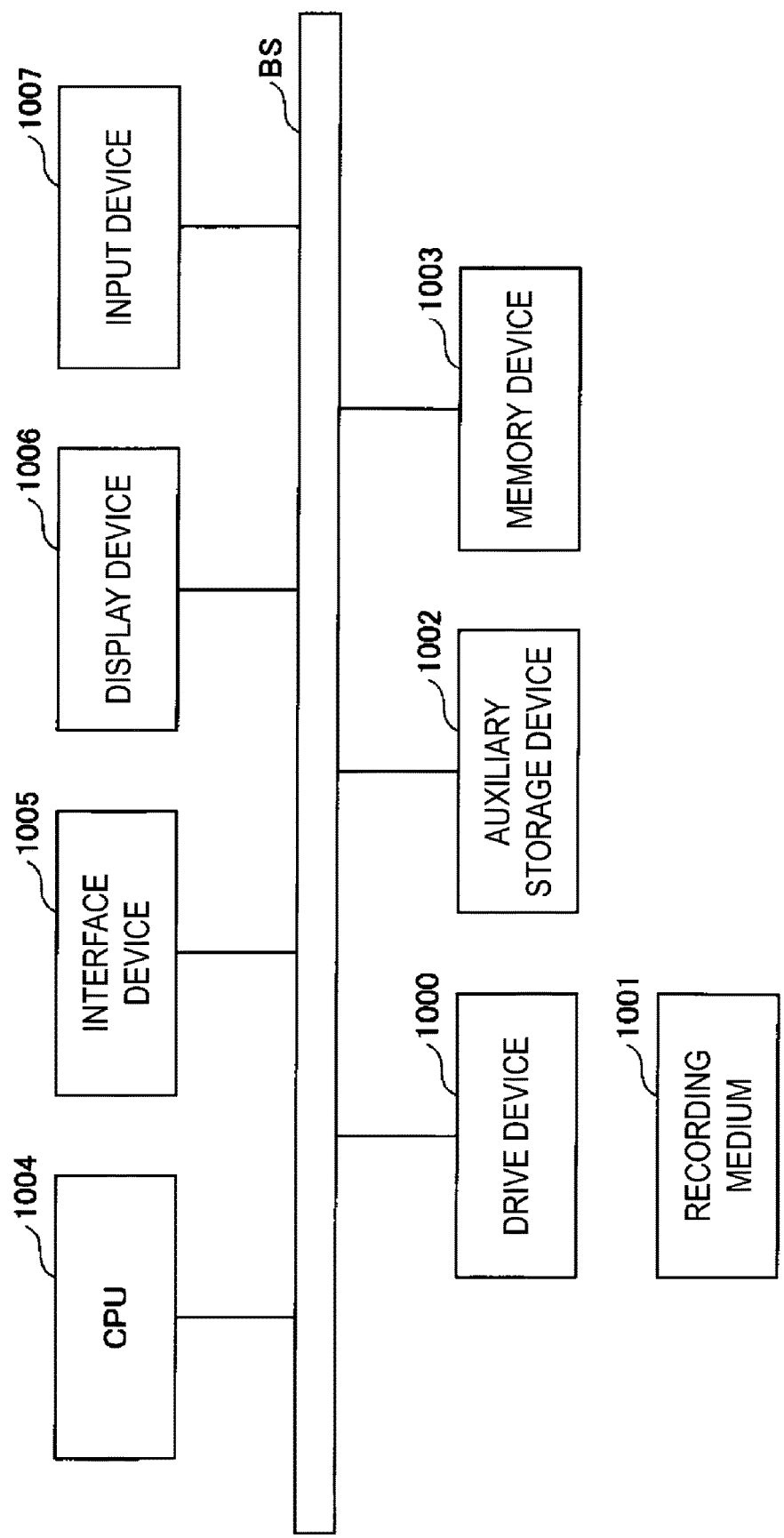
FIG. 10 is a diagram illustrating an example of a hardware configuration of the device.

FIG. 10 is a diagram illustrating an example of a hardware configuration of the computer in the embodiment. The computer in FIG. 10 includes a drive device 1000, an auxiliary storage device 1002, a memory device 1003, a CPU 1004, an interface device 1005, a display device 1006, an input device 1007, and the like which are connected to each other through a bus B.

A program for implementing processing in the computer is provided by, for example, the recording medium 1001 such as a compact disc read only memory (CD-ROM) or a memory card. When the recording medium 1001 that stores the program is set in the drive device 1000, the program is installed in the auxiliary storage device 1002 from the recording medium 1001 via the drive device 1000. Here, the program may not necessarily be installed from the recording medium 1001 and may be downloaded from another computer via a network. The auxiliary storage device 1002 stores the installed program and also stores a necessary file, data, and the like.

The memory device 1003 reads the program from the auxiliary storage device 1002 and stores the program when a command to activate the program is given. The CPU 1004 performs functions related to the control device 100 in accordance with the program stored in the memory device 1003. The interface device 1005 is used as an interface connected to a network. The display device 1006 displays a graphical user interface (GUI) or the like according to a program. The input device 1007 includes a keyboard, a mouse, buttons, a touch panel, and the like, and is used to input various operation commands.

A manifest control system described later can be implemented by causing a computer to execute a program in a manner similar to the above description.

The operation of the control device 100 will be described in detail using Examples 1 to 4. In Example 1, processing of registering the distribution information from the distribution system 300 to the control device 100 will be described. In Example 2, processing in which the control device 100 receives a viewing request, calculates an available band, creates notification information based on the available band and the viewing request, and transmits the created notification information to the client terminal 200 will be described. In Example 3, regular processing in which the control device 100 updates the allocated band in the DB 130 will be described. In Example 4, processing in which the control device 100 receives a viewing request, creates notification information, and transmits the notification information to the manifest control system will be described.

Example 1

Figure 11:
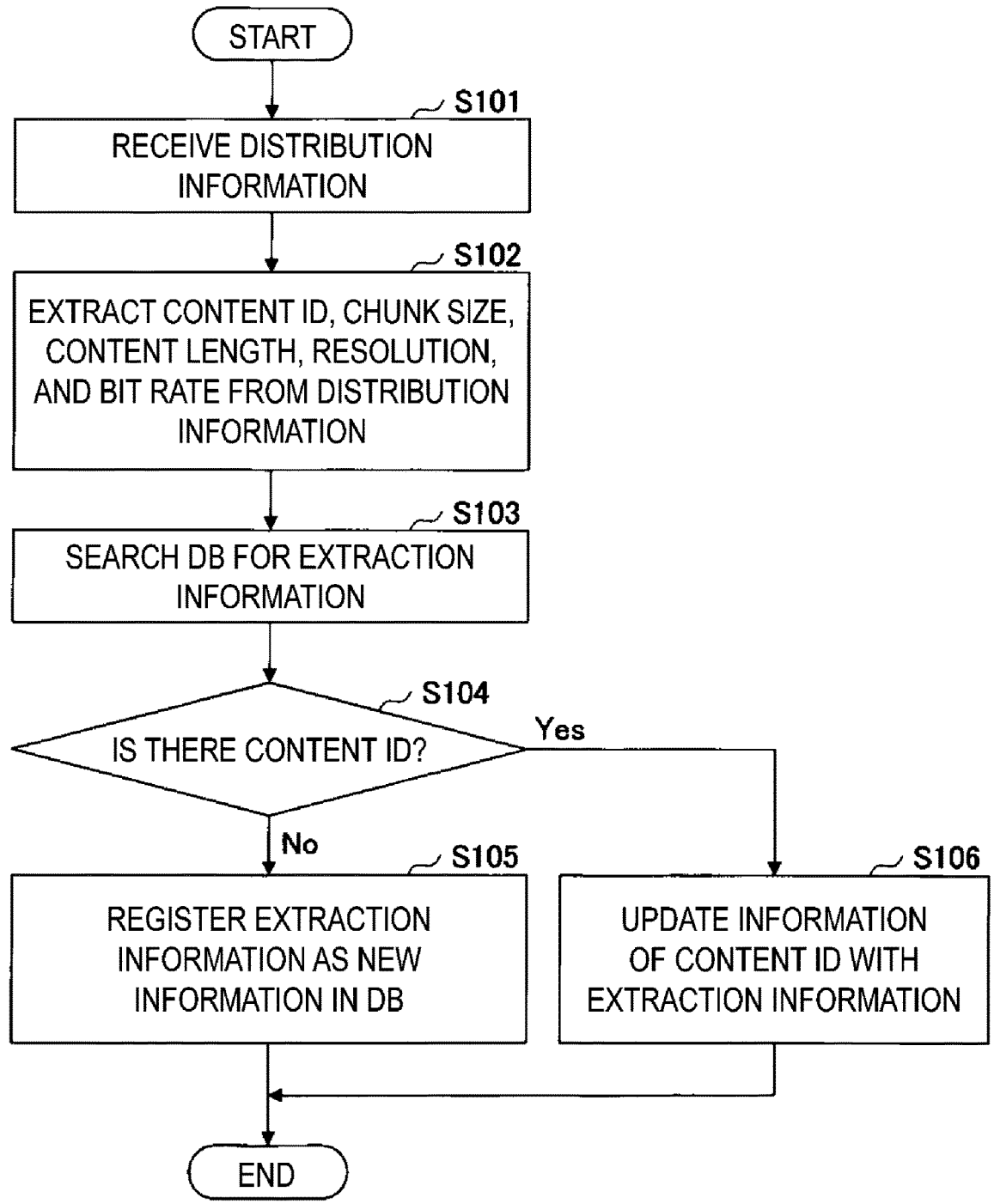
FIG. 11 is a flowchart illustrating a processing procedure in Example 1.
Figure 12:
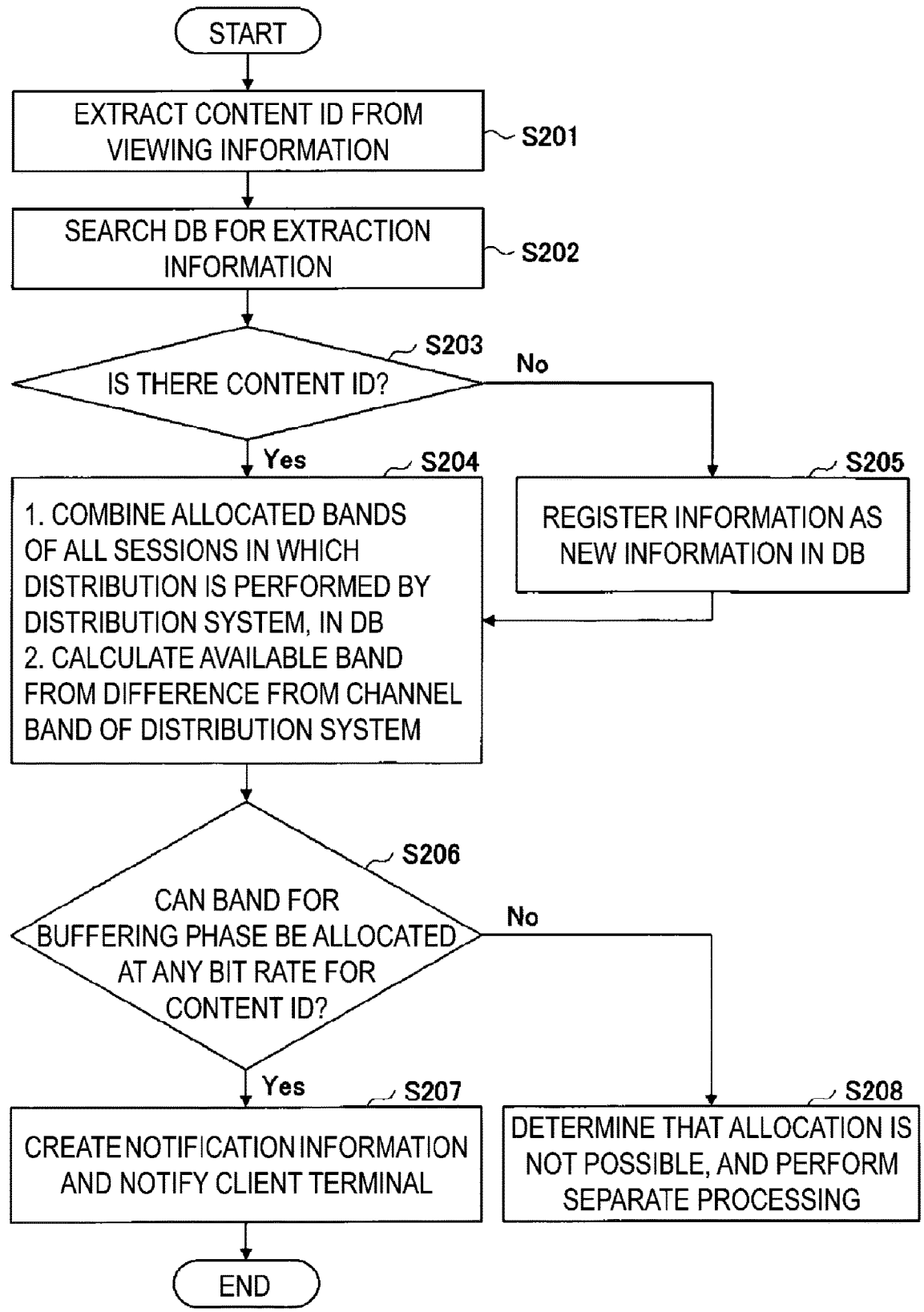
FIG. 12 is a flowchart illustrating a processing procedure in Example 2.

Firstly, Example 1 will be described with reference to the flowchart of FIG. 11. In Example 1, processing of registering the distribution information from the distribution system 300 to the control device 100 will be described. The similar flow is performed when the distribution information is registered from the content provider 400 to the control device 100. The distribution information is information of video data that can be distributed by the distribution system 300.

In S101 (Step 101), the distribution information registration unit 110 receives the distribution information transmitted from the distribution system 300. In S102, the distribution information registration unit 110 extracts a content ID, a chunk size, a content length, a resolution, and a bit rate from the received distribution information.

In S103, the distribution information registration unit 110 searches the DB 130 for extraction information obtained by extraction in S102. In the example illustrated in FIG. 4, the DB 130 stores, as distribution information, values for the content ID, the chunk size, the content length, the resolution, and the bit rate, respectively.

In S104, the distribution information registration unit 110 determines whether or not a content ID coinciding with the content ID in the extraction information is in the DB 130. In accordance with a determination that the coinciding content ID is not in the DB 130, the process proceeds to S105. In accordance with a determination that the coinciding content ID is in the DB 130, the process proceeds to S106.

In S105, the distribution information registration unit 110 registers the extraction information as new information, in the DB 130. In S106, the distribution information registration unit 110 updates information of the content ID with the extraction information in the DB 130.

Example 2

Next, Example 2 will be described. In Example 2, processing in which the control device 100 receives a viewing request, creates notification information, and transmits the notification information to the client terminal 200 will be described.

The viewing request includes the content ID of the requested content (video data). In S201, the control unit 120 that has received the viewing request extracts the content ID from information of the viewing request. In S202, the control unit 120 searches the DB 130 for the content ID being the extraction information.

In S203, the control unit 120 determines whether or not the content ID being the extraction information is in the DB 130. In accordance with a determination that the content ID being the extraction information is in the DB 130, the process proceeds to S204. In accordance with a determination that the content ID being the extraction information is not in the DB 130, the process proceeds to S205. In S205, for example, the control unit acquires distribution information corresponding to the searched content ID from the distribution system 300 or the like and registers the acquired distribution information as new information, in the DB 130. Then, the process proceeds to S204.

In S204, the control unit 120 firstly combines allocated bands of all sessions in which the distribution system 300 performs video distribution, from band allocation information stored in the DB 130.

Then, the control unit 120 calculates an available band from a difference between the combined allocated bands and the channel band of the distribution system 300.

It is assumed that the distribution system 300 connected with the client terminal 200 is a server (referred to as SV-1) having a distribution system ID of SV-1 in the band allocation information in FIG. 5 and the distribution system information in FIG. 6. At this time, the sum of the allocated bands for SV-1 in the band allocation information of FIG. 5 is the sum of the allocated bands calculated in S204. The channel band at this time is a channel band of SV-1 illustrated in FIG. 6.

Assuming that the sum of the allocated bands of all sessions in which the distribution system 300 performs video distribution is 9 Gbps, because the channel band of SV-1 is 10 Gbps, the difference between the allocated bands of all sessions and the channel band in this case is 1 Gbps, and thus 1 Gbps is the available band. The difference itself may be set as the available band, or a value less than the difference may be set as the available band in view of a certain degree of margin.

In S206, the control unit 120 determines whether or not a band for the Buffering phase can be allocated at any bit rate for the content ID.

In other words, for example, assuming that the content ID of the viewing request is 1, the control unit 120 obtains the information illustrated in FIG. 7 from the distribution information illustrated in FIG. 4, and determines whether or not the band for the Buffering phase can be allocated at any bit rate of four bit rates indicated in the information.

Here, the Buffering phase will be described. With the ABR algorithm, a video may be acquired using a very large band compared to the bit rate of video data immediately after being played. In this case, if a large band is not allocated immediately after the start of distribution between the client terminal 200 and the distribution system 300, the client terminal 200 may not select the assumed bit rate.

Thus, a large band is allocated at the beginning of the distribution of video data. Such a first phase of the distribution is referred to as the Buffering phase. Then, when transitioning to the stable play, a band close to the video bit rate is allocated. This phase is referred to as the Stable phase.

For example, the band for the Buffering phase may be predetermined for each bit rate, may be calculated from the bit rate with a predetermined calculation expression (for example, bit rate×2), or may be determined with other methods.

In S206, in the example illustrated in FIG. 7, the control unit 120 determines whether or not the band for the Buffering phase can be allocated at any of bit rates of 10, 5, 3, and 0.5. For example, assuming that the available band is 15 and the bands for the Buffering phase for video data having a bit rate of 10, 5, 3, and 0.5 are respectively 20, 10, 6, and 1, the control unit determines that it is not possible to allocate the band for the Buffering phase for the video data having a bit rate of 10, but the bands for the Buffering phase for the video data having a bit rate of 5, 3, and 0.5 can be allocated.

In accordance with a determination of YES in S206, the process proceeds to S207. In S207, the control unit 120 causes notification information to contain the maximum bit rate at which the band for the Buffering phase falls within the available band and the lower bit rate among one or more bit rates corresponding to the above content ID, and notifies the client terminal 200 of the notification information. In the above example, 5, 3, and 0.5 are contained in the notification information. In this case, the client terminal 200 determines that the video data having the bit rate of any of 5, 3, and 0.5 can be requested. The example in this case corresponds to the example illustrated in FIG. 8. A session ID in FIG. 8 may be assigned by the control unit 120 or may be assigned by the distribution system 300.

This is just an example. For example, only the maximum bit rate at which the band for the Buffering phase falls within the available band may be contained in the notification information. In this case, the client terminal 200 determines that the video data having a bit rate greater than the maximum bit rate is not requested.

With such a control, it is possible to prevent an occurrence of a situation in which video data having an excessive bit rate compared to the available band is not requested for the client terminal 200 at the start of viewing. As a result, it is possible to stabilize the distribution rate of the distribution system 300 and improve the viewing quality at the client terminal 200.

In S207, the control unit 120 adds a new entry in the band allocation information. The details of the entry are, for example, a content ID, a session ID, a band for the Buffering phase corresponding to a maximum bit rate of which the client terminal 200 is notified, and a distribution start time. Here, the distribution start time may be the current time, may be a time at which it is estimated that distribution to the client terminal 200 is started, or may be a distribution start time of which a notification is received from the distribution system 300.

The band allocation information illustrated in FIG. 5 is generated by such entry addition. As described below, the band allocation information is updated at any time. The allocated band in the band allocation information is an estimated band for the control. The control of the actual band allocation for the network 500 may be performed by the control device 100 or a device other than the control device 100.

In accordance with a determination that allocation is not possible at any bit rate in S206, in S208, the control unit 120 determines that the allocation is not possible, and performs separate processing. The separate processing is not limited to specific processing. For example, the control unit performs processing of allocating a band for another distribution system and commanding the change of the distribution system to the client terminal 200. The control unit may perform processing of not allocating the band and limiting the rate.

Example 3

Next, Example 3 will be described. In Example 3, regular processing in which the control device 100 updates the allocated band in the DB 130 will be described with reference to the flowchart of FIG. 13.

In S301, the control unit 120 initializes a variable i to 1. In S302, the control unit 120 extracts the distribution start time of data in the i-th entry from the band allocation information (for example, FIG. 5).

In S303, the control unit 120 determines whether or not a value obtained by subtracting the distribution start time from the current time is within a range of n seconds to (n+t) seconds. Here, n indicates the length of the Buffering phase, for example, and t indicates the time taken to transition from the end of the Buffering phase to the Stable phase. The specific values of n and t may be values defined in advance, or may be values determined in accordance with the state of the network, the characteristics of the ABR algorithm of the client terminal 200, and the like.

In accordance with a determination of NO in S303, the process proceeds to S305, and no particular processing is performed. This indicates that the data in the above entry is in the Buffering phase or the Stable phase.

In accordance with a determination of YES in S303, the process proceeds to S304. The control unit 120 sets the allocated band in this entry as a value of x % of the current band, and overwrites the DB 120. This corresponds to overwriting the band for the Stable phase in the band for the Buffering phase. x is, for example, a value less than 100, and the specific value of x may be a value defined in advance, or may be a value determined in accordance with the state of the network, the characteristics of the ABR algorithm of the client terminal 200, and the like.

Figure 13:
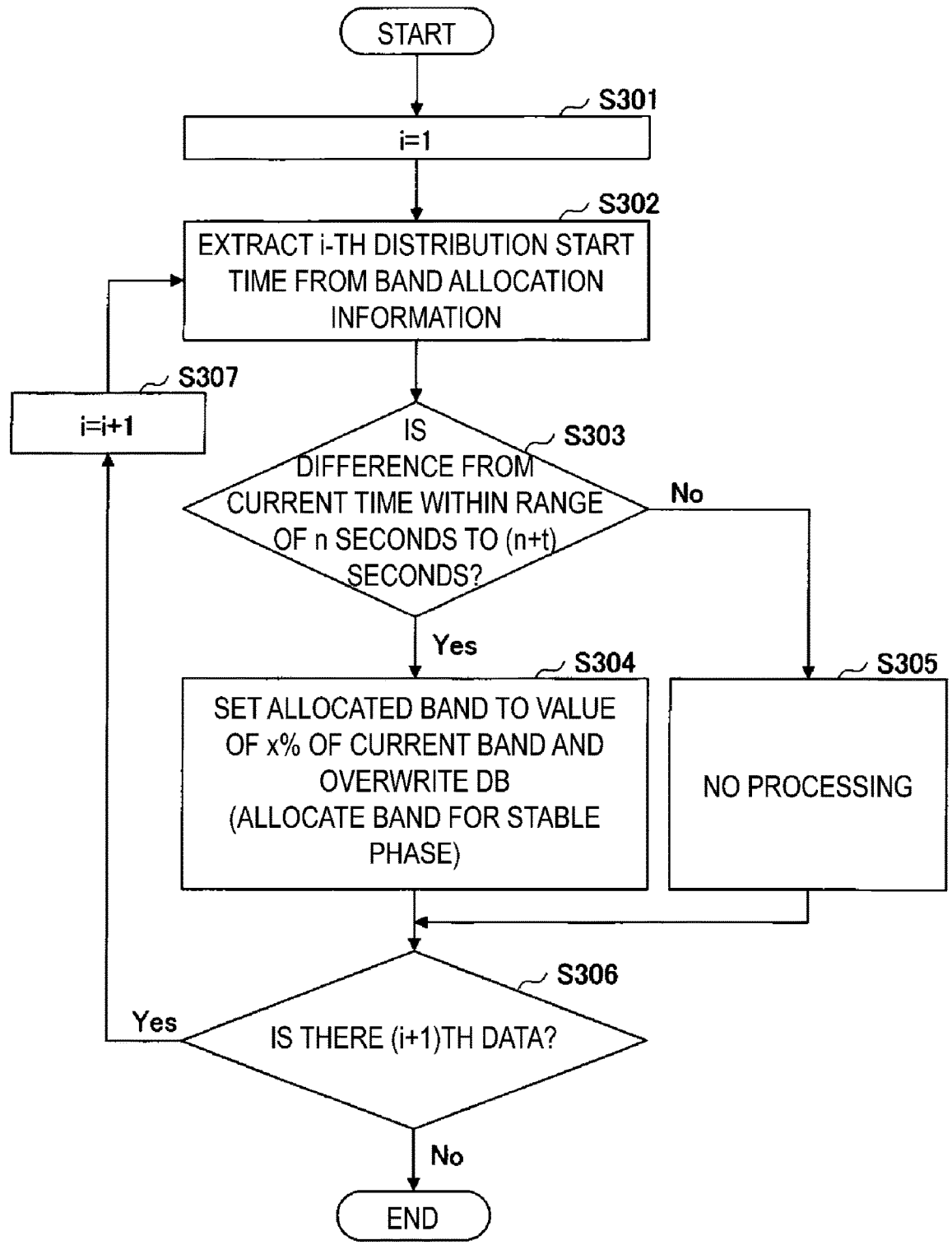
FIG. 13 is a flowchart illustrating a processing procedure in Example 3.

The above processing is performed on pieces of data in all entries (S306 and S307). The processing illustrated in FIG. 13 is performed at predetermined time intervals.

With the above processing, the allocated bands in the band allocation information have a value close to the actual band value. Thus, it is possible to more accurately determine the available band in the rate control described in Example 2.

Example 4

The control device 100 does not control the client terminal 200 directly, and may control the client terminal 200 via another system. In Example 4, a manifest control system is utilized as another system.

Figure 14:
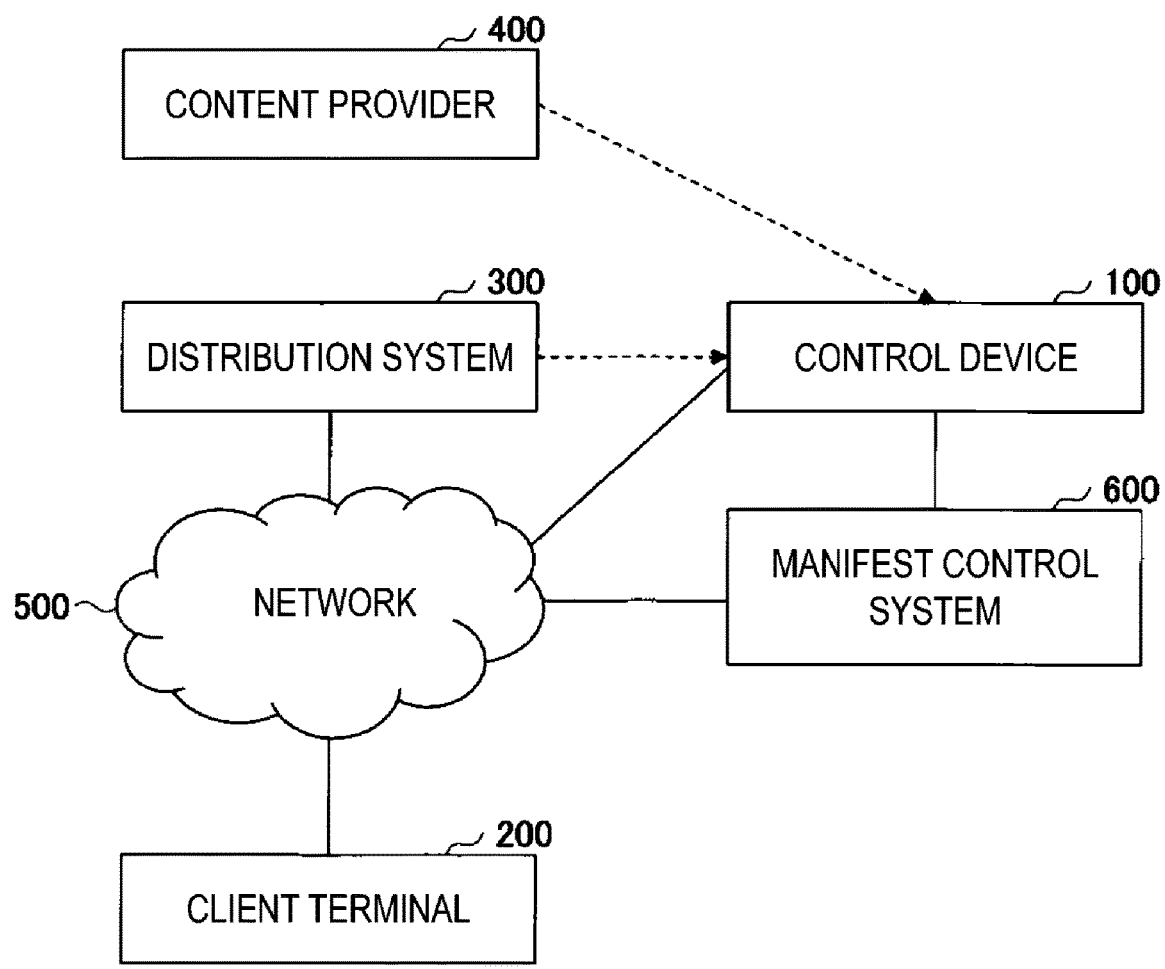
FIG. 14 is a diagram illustrating a system configuration in Example 4.

FIG. 14 illustrates a system configuration in Example 4. As illustrated in FIG. 14, a manifest control system 600 is added to the system in Examples 1 to 3. A system in Example 4 is identical to the system in Examples 1 to 3 except that the manifest control system 600 is added.

In the manifest control system 600, for example, a manifest file acquired from an existing server such as a manifest server is stored in a storage device such as a memory. The manifest control system 600 rewrites the manifest file based on notification information received from the control device 100, and transmits the rewritten manifest file to the client terminal 200.

The manifest file is, for example, a playlist of HLS, an MPD of MPEG-DASH, and the like, and the manifest file is not limited to the example. For example, the image quality (bit rate) and the manner when video data is divided into segment files, where the segment file is to be requested, and the like are described in the manifest file.

Figure 15:
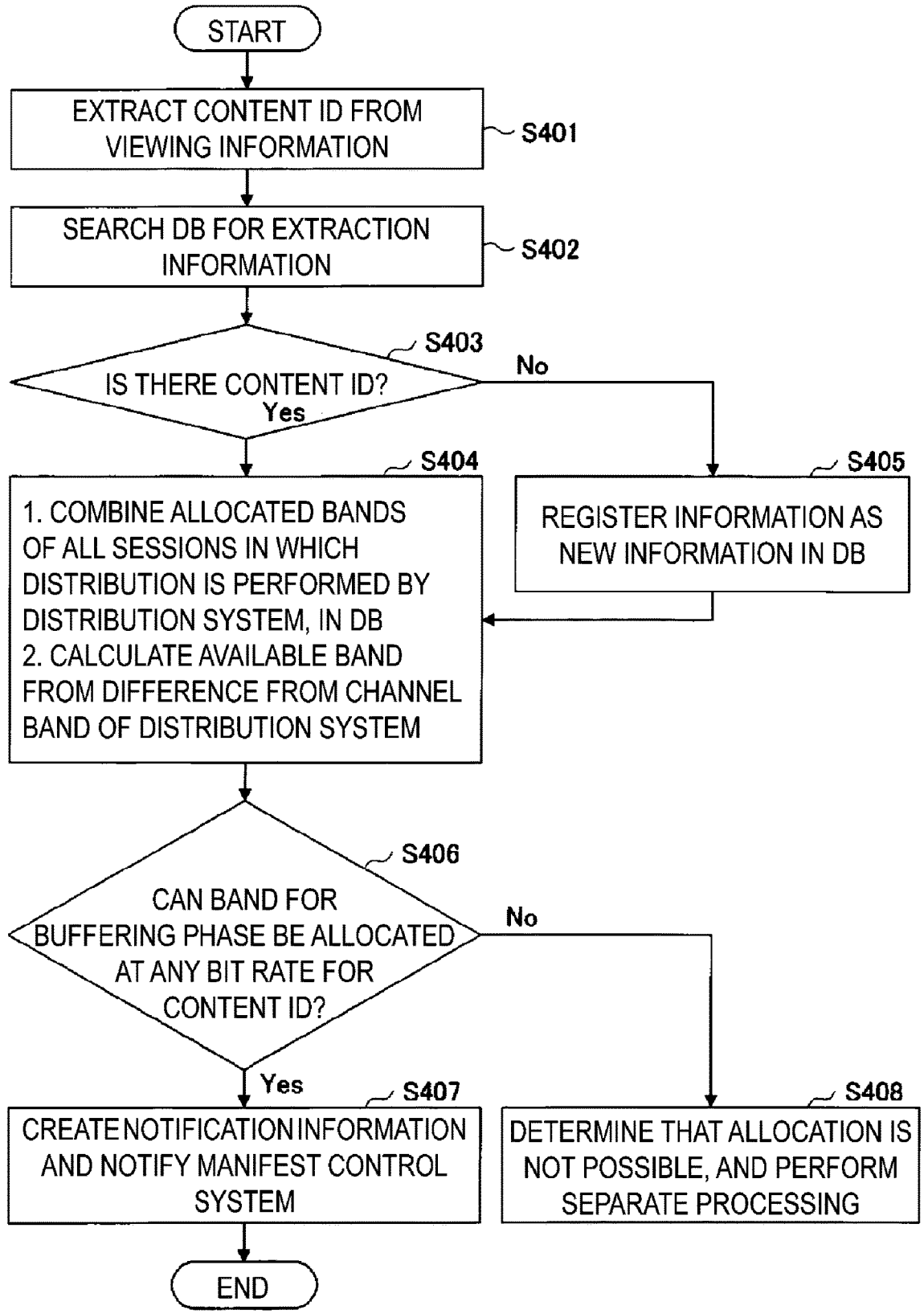
FIG. 15 is a flowchart illustrating a processing procedure in Example 4.

FIG. 15 illustrates a flowchart of processing in Example 4. The details of processing in S401 to S406, and S408 are identical to those in S201 to S206, and S208 in Example 2. Here, in the separate processing in S408, the manifest control system is commanded to change the distribution system.

In S407, the control unit 120 creates the notification information in the similar manner to the creation of the notification information in S207 in Example 2. In Example 4, the control unit 120 transmits the notification information to the manifest control system 600.

For example, it is assumed that the notification information illustrated in FIG. 8 is transmitted to the manifest control system 600. In this case, for example, a list of the resolutions and the bit rates illustrated in FIG. 9 is described in the manifest file before rewriting of the corresponding video data stored by the manifest control system 600. The manifest control system 600 rewrites the list of the resolutions and the bit rates illustrated in FIG. 9 to the list of the resolutions and the bit rates illustrated in FIG. 8, and transmits the rewritten manifest file to the client terminal 200.

The client terminal 200 recognizes the selectable bit rate based on the rewritten manifest file. Thus, in this example, video data having a bit rate of 10 is not requested.

In addition, the control device 100 may receive identification information (for example, location and gender) for identifying attributes of a viewer at the client terminal 200 together with the viewing request, and further receive, from the network 500, the validity of the distribution system and the network status such as the throughput and the delay (the validity of the distribution system and the network status are collectively referred to as a "system status").

In this case, in S407, the control device 100 transmits the identification information or the system status (or both the identification information and the system status) to the manifest control system 600, together with the notification information. The manifest control system 600 may acquire the identification information and the system status from the client terminal 200 and the network 500.

The manifest control system 600 rewrites the manifest file based on the notification information and at least one of the identification information, the time section of the current time, and the system status, and transmits the rewritten manifest file to the client terminal 200.

For example, the manifest control system 600 stores a table in which at least one of the identification information, the time section, and the system status is associated with a distribution system as a destination for acquiring video data. The manifest control system selects the distribution system as the destination for acquiring video data in accordance with the table and describes the URL and the like of the selected distribution system as the destination for acquiring video data, in the manifest file together with the above-described notification information.

For example, by using a table in which the system status is associated with the distribution system as the destination for acquiring video data, it is possible to generate a manifest file in which the valid distribution system is described. Thus, it is possible to avoid a request of video data to a distribution system in which a problem has occurred.

Effects of Embodiment

As described above, according to the embodiment, the maximum bit rate selectable by the client terminal is calculated based on the information of the viewing request and the distribution information, and the client terminal is notified of the calculated maximum bit rate. Thus, it is possible to stabilize the distribution rate of the distribution system and improve the viewing quality at the client terminal.

Supplement

In the embodiment, at least a control device, a control method, and a program as follows are provided.

Item 1

A control device for controlling a bit rate selectable by a client terminal in a video distribution network in which video data is distributed, the control device including:

a database configured to store distribution information, band allocation information, and distribution system information, the distribution information containing information on video data in a distribution system, the band allocation information containing an allocated band of each session in which the distribution system performs video distribution, and the distribution system information containing a channel band of the distribution system; and a control unit configured to receive a viewing request from the client terminal, calculate an available band in the distribution system with reference to the database, and determine a maximum bit rate selectable by the client terminal based on the available band and one or more bit rates of video data corresponding to the viewing request.

Item 2

The control device described in Item 1, in which the control unit calculates a sum of the allocated bands of all sessions in which the distribution system performs the video distribution, and calculates the available band based on a difference obtained by subtracting the sum of the allocated bands from the channel band of the distribution system.

Item 3

The control device described in Item 1 or 2, in which the control unit determines, as the maximum bit rate, a maximum bit rate at which a band for buffering is smaller than the available band among the one or more bit rates.

Item 4

The control device described in any one of Items 1 to 3, in which the control unit regularly executes, for each entry in the band allocation information, when a difference between a distribution start time and a current time is within a predetermined range, processing of overwriting the allocated band with a band for a stable phase.

Item 5

The control device described in any one of Items 1 to 4, in which the control unit transmits notification information containing the maximum bit rate to the client terminal or a manifest control system.

Item 6

The control device described in Item 5, in which when the control unit transmits the notification information containing the maximum bit rate to the manifest control system, the manifest control system rewrites a manifest file based on the notification information and transmits the rewritten manifest file to the client terminal.

Item 7

A control method performed by a control device for controlling a bit rate selectable by a client terminal in a video distribution network in which video data is distributed, the control device including a database configured to store distribution information, band allocation information, and distribution system information, the distribution information containing information on video data in a distribution system, the band allocation information containing an allocated band of each session in which the distribution system performs video distribution, and the distribution system information containing a channel band of the distribution system, the method including:

receiving a viewing request from the client terminal;

calculating an available band in the distribution system with reference to the database; and determining a maximum bit rate selectable by the client terminal based on the available band and one or more bit rates of video data corresponding to the viewing request.

Item 8

A program causing a computer to function as the control unit in the control device described in any one of Items 1 to 6, in which The embodiment has been described above, but the present invention is not limited to the specific embodiments. Various modifications and changes can be made within the scope of the gist of the present invention described in the aspects.

REFERENCE SIGNS LIST

100 Control device
110 Distribution information registration unit
120 Control unit
130 DB
200 Client terminal
300 Distribution system
400 Content provider
500 Network
1000 Drive device
1002 Auxiliary storage device
1003 Memory device
1004 CPU
1005 Interface device
1006 Display device
1007 Input device

The invention claimed is:

1. A control device for controlling a bit rate selectable by a client terminal in a video distribution network in which video data is distributed, the control device comprising:
a database configured to store distribution information, band allocation information, and distribution system information, the distribution information including information regarding video data in a distribution system, the band allocation information including an allocated band of each session in which the distribution system performs video distribution, and the distribution system information including a channel band of the distribution system; and
a control unit, implemented using one or more computing devices, configured to:
receive a viewing request from the client terminal,
calculate an available band in the distribution system with reference to the database, and
determine a first maximum bit rate selectable by the client terminal based on the available band and one or more bit rates of video data corresponding to the viewing request,
wherein the control unit is configured to execute, for each entry in the band allocation information, based on a difference between a distribution start time and a current time being within a predetermined range, processing of overwriting the allocated band with a band for a stable phase.

2. The control device according to claim 1, wherein the control unit is configured to:
calculate a sum of the allocated bands of all sessions in which the distribution system performs the video distribution, and
calculate the available band based on a difference obtained by subtracting the sum of the allocated bands from the channel band of the distribution system.

3. The control device according to claim 1, wherein the control unit determines, as the first maximum bit rate, a second maximum bit rate at which a band for buffering is less than the available band among the one or more bit rates.

4. The control device according to claim 1, wherein the control unit transmits notification information including the first maximum bit rate to the client terminal or a manifest control system.

5. The control device according to claim 4, wherein, based on the control unit transmitting the notification information including the first maximum bit rate to the manifest control system, the manifest control system rewrites a manifest file based on the notification information and transmits the rewritten manifest file to the client terminal.

6. A control method performed by a control device for controlling a bit rate selectable by a client terminal in a video distribution network in which video data is distributed, the control device including a database configured to store distribution information, band allocation information, and distribution system information, the distribution information including information regarding video data in a distribution system, the band allocation information including an allocated band of each session in which the distribution system performs video distribution, and the distribution system information including a channel band of the distribution system, the method comprising:
receiving a viewing request from the client terminal;
calculating an available band in the distribution system with reference to the database;
determining a first maximum bit rate selectable by the client terminal based on the available band and one or more bit rates of video data corresponding to the viewing request; and
executing, for each entry in the band allocation information, based on a difference between a distribution start time and a current time being within a predetermined range, processing of overwriting the allocated band with a band for a stable phase.

7. A non-transitory recording medium storing a program, wherein execution of the program causes one or more computers to perform operations comprising:
storing, in a database, distribution information, band allocation information, and distribution system information, the distribution information including information regarding video data in a distribution system, the band allocation information including an allocated band of each session in which a distribution system performs video distribution, and the distribution system information including a channel band of the distribution system;
receiving a viewing request from a client terminal;
calculating an available band in the distribution system with reference to the database;

determining a first maximum bit rate selectable by the client terminal based on the available band and one or more bit rates of video data corresponding to the viewing request; and executing, for each entry in the band allocation information, based on a difference between a distribution start time and a current time being within a predetermined range, processing of overwriting the allocated band with a band for a stable phase.

8. The non-transitory recording medium according to claim 7, wherein calculating the available band comprises:
    calculating a sum of the allocated bands of all sessions in which the distribution system performs the video distribution, and
    calculating the available band based on a difference obtained by subtracting the sum of the allocated bands from the channel band of the distribution system.

9. The non-transitory recording medium according to claim 7, wherein determining the first maximum bit rate comprises determining, as the first maximum bit rate, a second maximum bit rate at which a band for buffering is less than the available band among the one or more bit rates.

10. The non-transitory recording medium according to claim 7, wherein the operations comprise transmitting notification information including the first maximum bit rate to the client terminal or a manifest control system.

11. The non-transitory recording medium according to claim 10, wherein the operations comprise, based on the notification information including the first maximum bit rate being transmitted to the manifest control system, rewriting, by the manifest control system, a manifest file based on the notification information and transmitting, from the manifest control system, the rewritten manifest file to the client terminal.

12. The control method according to claim 6, wherein calculating the available band comprises:
    calculating a sum of the allocated bands of all sessions in which the distribution system performs the video distribution, and
    calculating the available band based on a difference obtained by subtracting the sum of the allocated bands from the channel band of the distribution system.

13. The control method according to claim 6, wherein determining the first maximum bit rate comprises determining, as the first maximum bit rate, a second maximum bit rate at which a band for buffering is less than the available band among the one or more bit rates.

14. The control method according to claim 6, further comprising transmitting notification information including the first maximum bit rate to the client terminal or a manifest control system.

15. The control method according to claim 14, further comprising, based on the notification information including the first maximum bit rate being transmitted to the manifest control system, rewriting, by the manifest control system, a manifest file based on the notification information and transmitting, from the manifest control system, the rewritten manifest file to the client terminal.

* * * * *